United States Patent [19]

Trujillo

[11] 4,238,052
[45] Dec. 9, 1980

[54] ADJUSTABLE METERING LIQUID DISPENSER

[76] Inventor: John J. Trujillo, Castro Valley, Calif.

[21] Appl. No.: 834,571

[22] Filed: Sep. 19, 1977

Related U.S. Application Data

[63] Continuation-in-part of Ser. No. 629,694, Nov. 7, 1975, Pat. No. 4,057,174.

[51] Int. Cl.³ ............................................. B67D 5/22
[52] U.S. Cl. ........................................ 222/43; 222/49; 222/309; 222/385
[58] Field of Search ..................... 222/41, 43, 44, 49, 222/50, 309, 287, 383, 384, 385, 372, 130

[56] References Cited

U.S. PATENT DOCUMENTS

| | | | |
|---|---|---|---|
| 1,809,813 | 6/1931 | Kantor | 222/309 |
| 1,979,549 | 11/1934 | Huckel | 222/130 |
| 2,521,433 | 9/1950 | White | 222/385 |
| 2,792,157 | 5/1957 | Gilman | 222/309 |
| 3,211,335 | 10/1965 | Shapiro | 222/309 |
| 3,452,901 | 7/1969 | Roach | 222/49 |
| 4,057,174 | 11/1977 | Trujillo | 222/49 |

Primary Examiner—H. Grant Skaggs
Attorney, Agent, or Firm—Alvin E. Hendricson

[57] ABSTRACT

A liquid dispenser adapted to fit over the open top of a container has a pump plunger connected by valving between a depending inlet and an outlet for pumping liquid from the container and a limitedly movable gauge rod is disposed in spaced parallel relation to the plunger with means securing the plunger and rod together in adjustable longitudinal relation to thereby adjustably fix the plunger stroke for metering fluid dispensed per stroke of the plunger.

1 Claim, 4 Drawing Figures

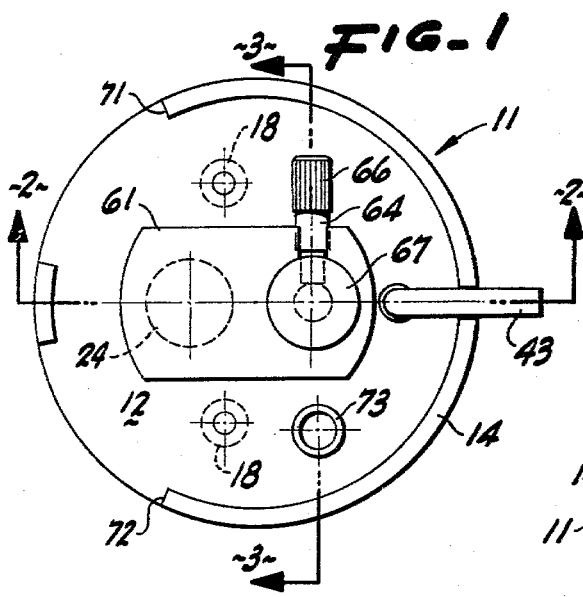
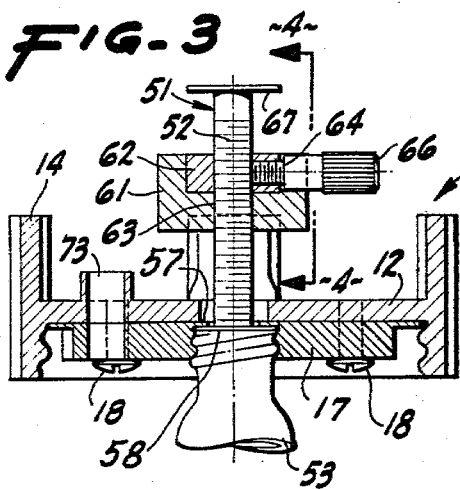
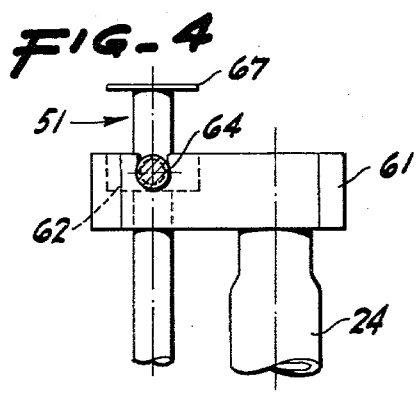
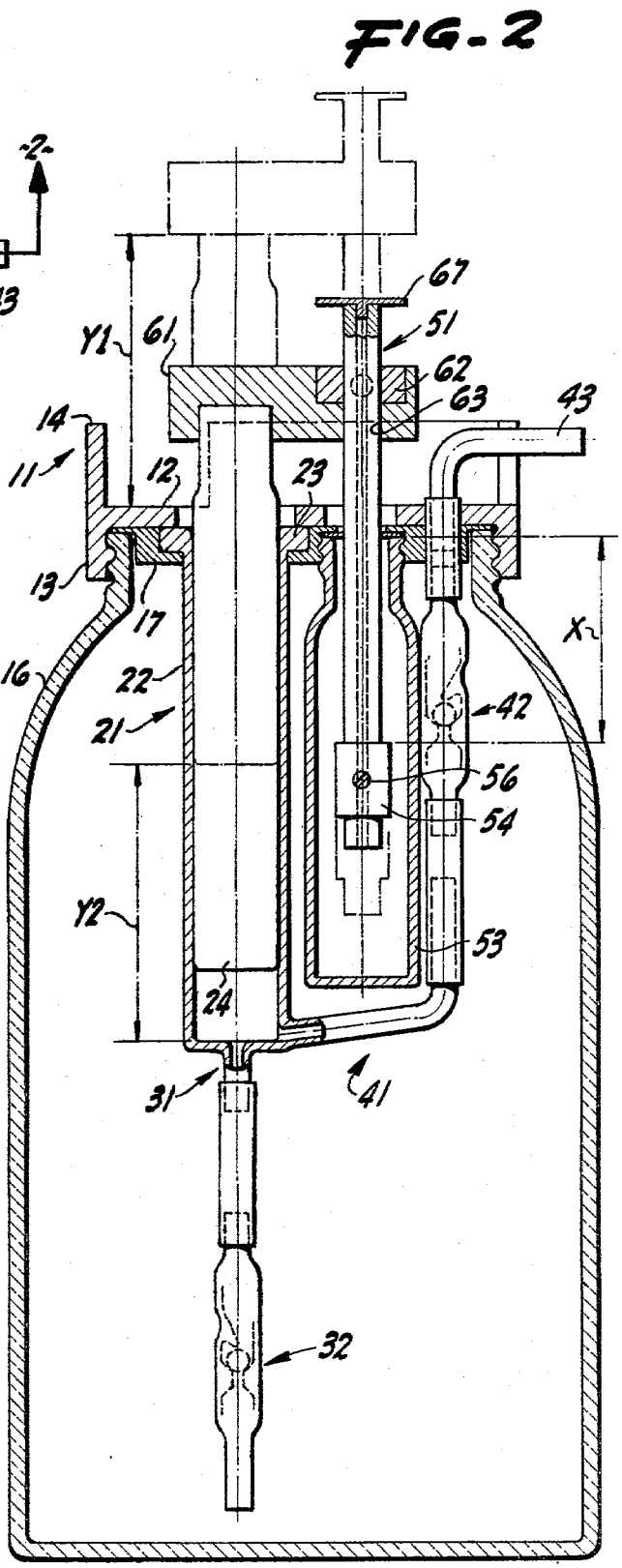

4,238,052

ADJUSTABLE METERING LIQUID DISPENSER

This is a continuation-in-part of my prior copending U.S. patent application Ser. No. 629,694, filed Nov. 7, 1975 for "Measuring Liquid Dispenser With Flat Top" and now issued as U.S. Pat. No. 4,057,174.

BACKGROUND OF INVENTION

For the precise dispensing or transfer of fluids there have been developed a wide variety of devices and exemplary patented devices of this type are identified in my above-noted copending patent application which discloses a further advancement in this field. For many applications the precision with which liquids can be dispensed is of utmost importance and the reproducibility of these precise dispensations is also of major importance. The scale post of U.S. Pat. No. 3,452,901 is highly advantageous in this respect, and the gauge rod of my above-identified patent application provides an additional degree of precision and reproducibility. It has been discovered however, that the provision of an upstanding indexed post or rod upon a bottle cap or the like results in a structure of limited stability. Such a measuring element is susceptible to some tilting so as to be slightly misaligned with the axis of a pump plunger. Inasmuch as the stroke of the pump plunger is fixed by the upwardly extending measuring means, any misalignment may produce a mismeasurement so as to decrease the reproducibility of successive dispensing operations. For many applications precise reproducibility is of prime importance and thus only very slight variations in the metered volume of liquid dispensed by successive operations may be unacceptable or at least highly undesirable.

SUMMARY OF INVENTION

The present invention comprises a liquid dispenser of the type disclosed in my copending patent application Ser. No. 629,694, and provides particular improvements thereover. The dispenser hereof comprises a cap structure adapted for attachment to the open top of a container for liquid and having all portions thereof normally depending from the cap structure so as to be normally disposed within the container. A manually operable pump is provided by a pump cylinder or barrel depending from the cap structure with inlet and outlet valving connected to the bottom of the barrel and a cylindrical plunger slidably disposed within the barrel for drawing fluid into the barrel and expeling fluid therefrom by plunger reciprocation.

The present invention provides a new and improved manner of precisely metering the amount of fluid displaced by each reciprocation of the pump plunger. In accordance with the present invention, a limitedly movable gauge rod is disposed in parallel spaced relationship to the pump plunger in extension through the cap structure and normally disposed within a sealed tube depending from the cap structure. About the lower end of the gauge rod there is provided a lateral extension adapted to engage the under side of the cap structure as the gauge rod is moved longitudinally of the axis thereof in order to limit the vertical displacement of the gauge rod. An enlarged upper end upon the pump plunger is normally disposed atop the cap structure and extends laterally from the pump plunger to accommodate extension of the gauge rod through this enlarged end. The gauge rod is slidably disposed in the lateral extension of the upper end of the pump plunger and means are provided for locking the gauge rod in desired longitudinal relationship to the pump plunger, as indicated by indicia disposed longitudinally along the gauge rod.

The present invention provides for reciprocation of the pump plunger and gauge rod and, inasmuch as the gauge rod has a limited axial movement, the plunger stroke may be precisely adjusted by fixing the relative longitudinal position of the gauge rod and pump plunger. With these elements fixed in predetermined longitudinal relationship, each complete or full stroke of the pump plunger will, in fact, dispense a predetermined and precisely reproducible amount of fluid. Prior art problems of mounting indicating means for a liquid dispenser are overcome by the structure of the present invention. Additionally, the present invention provides for maintaining the parallelism between pump plunger and indicating means under all circumstances so as to maximize the precision of metering.

DESCRIPTION OF FIGURES

The present invention is illustrated as to a single preferred embodiment thereof in the accompanying drawings, wherein:

FIG. 1 is a top plan view of a liquid dispenser in accordance with the present invention;

FIG. 2 is a central vertical sectional view of the dispenser of FIG. 1 attached to a container for liquid and taken in the plane 2—2 of FIG. 1;

FIG. 3 is a transverse sectional view of the dispenser hereof taken in the plane 3—3 of FIG. 1; and FIG. 4 is a partial side view of the upper portion of the dispenser hereof taken in the plane 4—4 of FIG. 3.

DESCRIPTION OF PREFERRED EMBODIMENT

The preferred embodiment of the present invention illustrated in the accompanying drawings comprises a cap structure 11 including a circular plate or floor 12 having a depending annular flange or wall 13 thereabout and an upstanding annular wall 14 thereabout. The annular depending flange 13 is shown to be provided with internal threads for threading of the cap structure 11 onto the open top of a liquid dispenser such as a bottle 16. For convenience of manufacture, the cap structure may also include a lower plate 17 secured in contiguous relation immediately beneath the floor of plate 12 as by screws or bolts 18 extending through the lower plate into threaded engagement with the plate 12. This lower plate 17 may have a somewhat greater thickness than the thickness of plate 12, for reasons noted below, and is preferably formed with an annular shoulder having a diameter that is less than the thread diameter of the flange 13 so as to fit into the neck of the bottle 16, as shown in FIG. 1.

The dispenser of the present invention includes a small manually or machine operable pump 21 comprised as an open topped cylindrical tube or barrel 22 depending from the cap structure and mounted thereon as by a lateral flange 23 about the open top thereof disposed in an indentation in the upper surface of the lower plate 17 so that the lower plate then fits under this flange to hold the barrel in position, as shown. Within the pump barrel or cylinder 22, there is slidably disposed a cylindrical piston or plunger 24 which may be formed as a hollow cylinder with a closed bottom end and which fits the interior of the barrel in very close sliding engagement so as to preclude the passage of liquid thereabout. The pump plunger 24 extends from the bottom of the cylinder 22 upwardly through the floor 12 of the cap structure.

At the bottom of the pump cylinder or barrel 22 there is provided an inlet line 31 communicating with the interior of the barrel at the bottom thereof. A check valve 32 is provided in this inlet line which is preferably dimensioned to depend substantially to the bottom of the container or bottle 16 upon which the present invention is adapted to be mounted. A pump outlet line 41 communicates with the interior of the barrel 22 through a side of the barrel at the bottom thereof and slants slightly upwardly therefrom for connection to an outlet check valve 42. A dispenser tube or nozzle 43 is disposed above the floor or plate 12 and is connected as by means of a flexible tube through the cap structure to the check valve 42 with a portion of the outlet tube 43 extending laterally outward of the cap structure through a slot in the upstanding wall 14 thereof. Reciprocation of the pump plunger 24 will be seen to draw liquid through the check valve 32 and inlet line 31 into the pump barrel 22 and thence to discharge such liquid through the outlet line 41 and check valve 42 to the outlet tube or nozzle 43. This pump structure is substantially the same as that shown in my above-noted co-pending patent application.

The present invention provides for very precise metering of liquid dispensed thereby and to this end there is provided an elongated gauge rod 51 having indicia 52 marked thereon along the length thereof and normally disposed to depend from the floor of the cap structure. The gauge rod 51 extends through aligned openings in the upper and lower plates 12 and 17 of the cap structure and beneath the cap structure the gauge rod is disposed within a tube 53 having a closed lower end and an open upper end secured to the lower plate 17 as by threaded engagement therewith at the gauge rod opening therethrough. The tube 53 seals the gauge rod from liquids in the container 16.

The gauge rod 51 is adapted for limited axial or longitudinal movement and the extent of upward movement of the rod is limited by a collar or the like 54 secured about the lower end of the gauge rod as by means of a screw or bolt 56 threaded through the collar and bearing upon the gauge rod or extending into an indentation therein. The cross-sectional dimensions of the upper open end of the tube 53 are greater than those of the collar 54 so that the gauge rod with collar thereon may be inserted in the tube from the top and a washer 58 is disposed atop the tube 53 and held in position thereat by the upper rim of the tube forcing the washer against a shoulder 57 on the lower plate about the gauge rod opening therethrough. The washer 58 has a central opening therethrough which is dimensioned to slidably accept the gauge rod in extension therethrough so as to close off the interior of the depending tube 53. Upward movement of the gauge rod is limited by the collar 54 thereabout which will engage the washer 58 as the gauge rod is moved upwardly to its maximum extent.

Atop the pump plunger 24 there is attached a lateral extension or block 61, preferably having a planar under surface adapted to normally rest upon the floor 12 of the cap structure. The gauge rod and pump plunger are disposed in spaced parallel relationship with the gauge rod 51 slidably extending vertically through the lateral extension or block 61 atop the plunger. Provision is made for locking the gauge rod in adjusted longitudinal relationship to the pump plunger and to this end there may be provided an annular collar 62 disposed in an indentation in the block 61 about an opening 63 therethrough. The gauge rod 51 extends through this opening 63 and through the collar 62, as illustrated in the drawings, with a pin 64 threaded through the collar and extending through a lateral notch in the block with a knurled outer end 66. The gauge rod is slidably extended through the opening 63 in the block 61 and also through the collar 62 therein so that the longitudinal position of the gauge rod may be adjusted. With the gauge rod appropriately positioned in extension through the block 61, the pin 64 is turned to cause the inner end thereof to bear against the gauge rod 51 and to lock the rod in adjusted position relative to the block 61 and thus to the pump plunger 24. Atop the gauge rod 51 there is provided a top or cap 67 which is secured to the upper end of the gauge rod and extends laterally outward therefrom. The collar 62 and pin 64 therein is adapted to snap into the depression in the block 61 so as to be normally locked therein, as indicated in FIG. 4, and it is, of course, also possible to eliminate the collar and thread the pin 64 through the block 61.

It will be appreciated that the gauge rod and associated elements are assembled in a particular order during fabrication of the present invention. The gauge rod with the collar 54 thereon is first inserted in the tube 53 and the washer is then slid over the gauge rod so as to rest against the top of the tube 53. The gauge rod is then inserted through the openings in the cap from the bottom and the tube 53 is threaded into the lower plate 17. The pump plunger 24 is then lowered into the pump cylinder 22 with the lateral extension 61 fitting over the top of the gauge rod so that the gauge rod is extended through the opening 63 therein. With the collar 62 already inserted in the extension 61, the gauge rod will likewise extend through the central opening in the collar 62 so that the resultant structure is substantially that illustrated in FIG. 2 of the drawings. The top 67 is then secured to the gauge rod 51 so that all of the foregoing elements are, in fact, removably locked together.

The lateral extension 61 on the pump plunger 24 rests upon the cap floor 12 when the plunger is fully depressed so that the bottom thereof engages the bottom of the pump cylinder 22. The vertical height of the lateral extension 61 is no greater than the height of the upstanding wall 14 above the floor 12 so that the device normally presents a substantially flat top in order to facilitate the stacking of liquid containers or bottles 16 containing devices in accordance with the present invention. The upstanding wall 14 may be provided with cutouts as indicated at 71 and 72, in order to facilitate gripping of the lateral extension or block 61 in order to manually operate the pump 21. There is also provided a vent through the cap structure 11, as indicated at 78, and a removable cover is preferably provided therefor. This then provides for venting the interior of the bottle 16 in order to accommodate the pumping of fluid or dispensing of fluid therefrom by the present invention. It is also noted that the lower plate 17 of the cap structure is provided with a fairly substantial thickness in order to provide threads for the attachment of the tube 53 thereto and to engage the under side of the flange 23 about the pump cylinder 22. The peripheral configuration of the lower plate 17 is preferably such that the outer portion of the plate at the top thereof rests upon the top rim of the bottle 16, as illustrated in FIG. 2. The lower plate 17 is indented about the periphery thereof below this lateral extension so as to form a shoulder and preferably this thicker portion of the lower plate is dimensioned to engage the inner circumference of the top opening of the bottle 16. In this manner a tight seal may be effected about the top of the bottle.

Operation of the present invention is quite simple and, in fact, is quite similar to the operation of at least certain other dispensing devices including that of my above-noted copending patent application. The device hereof is threaded onto or otherwise attached to the open top of a container 16 having a liquid therein. The pump plunger 24 is reciprocated a number of times to purge the device of any entrapped air. With the pump plunger fully depressed, so that the lateral extension 61 thereof rests upon the floor 12 of the cap structure, the gauge rod 51 is raised as by gripping the top 67 thereof until the desired volume of fluid to be dispensed per stroke, as indicated by the markings 52, is aligned with the top of the lateral extension 61. The pin 64 is then turned as by the knurled end 66 thereof to thread the pin into the collar 67 and tighten the inner end of the pin against the gauge rod so as to lock the relative longitudinal positions of the pump plunger 24 and gauge rod 51. In this condition the device hereof is ready for successive operations to dispense the exact indicated amount of fluid for each full reciprocation of the pump plunger 24. At any time it is desired to change the amount of fluid dispensed per stroke of the pump, it is only necessary to depress the pump plunger until the lateral extension 61 thereof rests upon the floor 12 of the cap structure and, upon release of the gauge rod 51, to longitudinally move the gauge rod so that the new desired volume to be dispensed is indicated on the marking 52 at the top of the extension 61 and then to again lock the gauge rod. An individual stroke of the pump is accomplished by gripping the block or lateral extension 61 and drawing it upwardly as, for example, into the position shown in phantom in FIG. 2 of the drawing. The illustration of FIG. 2 shows the pump plunger in an intermediate position during the progress of a stroke wherein the gauge rod may be further moved upwardly a distance indicated as X on the figure. At the end of this vertical displacement X, the top of the collar 54 will engage the under side of the washer 58 to prevent further upward movement of the gauge rod or the pump plunger which is locked thereto. At this point the plunger and gauge rod will have been moved into the position illustrated in phantom at the top of FIG. 2. It will be seen that in this uppermost position the block or lateral extension 61 will have been moved upwardly a distance $Y_1$, which is equal to the vertical displacement $Y_2$ of the bottom of the plunger 24. Thus the present invention operates to precisely meter the amount of fluid dispensed from a container or the like during each stroke of the pump 21 of the device. It is to be noted that the markings 52 on the gauge rod 51 vary from the largest number at the top to the smallest number at the bottom, inasmuch as the further the gauge rod is moved through the lateral extension 61 before locking the gauge rod therein, the shorter the possible stroke of the pump plunger. It will be appreciated that the pump plunger 24 fits the barrel 22 quite snugly so that the plunger moves axially in a straight line and with the gauge rod attached to the plunger it follows that the gauge rod must move the same way so that no misalignment of pump plunger and gauge rod is possible. The present invention provides a particular improvement in liquid dispensers wherein the reproducibility of successive predetermined like dispensations of fluid is improved. Furthermore, the present invention provides an improvement in the device structure wherein prior art difficulties of mounting a gauge rod vertically above a container cap are overcome.

Although the present invention has been described with respect to a single preferred embodiment thereof, it will be apparent to those skilled in the art that numerous modifications and variations are possible within the scope of the present invention and thus it is not intended to limit the invention to the precise terms of description or details of illustration.

What is claimed is:

1. In a liquid dispensing device having a cap structure adapted to engage the open top of liquid container and including a pump having a vertically reciprocal plunger extending upwardly through the cap, the improvement comprising:

said cap structure including a lateral floor with an angular depending flange thereabout adapted to engage the open top of a container and a lower plate disposed contiguous to said floor beneath same, said pump including a pump cylinder depending from said cap structure and connected thereto with said pump plunger slidably engaging said cylinder and extending above said floor through aligned openings in said floor and lower plate, a longitudingly movable gauge rod with markings along the length thereof disposed in spaced parallel relation to the said pump plunger, means connecting the portion of said plunger extending through said cap to said gauge rod in adjustable sliding relation longitudingly of said plunger, a tube having a closed lower end and an open upper end threaded into said lower plate from the bottom thereof at an opening through said lower plate aligned with an opening through said floor, an annular member disposed beneath said plate above said tube and having a central opening there through slidably accepting said gauge rod in extension through said floor and lower plate, and a collar about said gauge rod adjacent the lower end thereof and adapted to engage said angular member upon upward movement of said gauge rod to thus limit the longitudal movement of said gauge rod, whereby adjustable longitudinal positioning of said gauge rod relative to said plunger predetermines the maximum stroke of said pump plunger to set the volume of fluid dispensed by each full reciprocation thereof.

* * * * *